(12) United States Patent
Kinoshita et al.

(10) Patent No.: US 10,675,757 B2
(45) Date of Patent: Jun. 9, 2020

(54) POSITIONING DEVICE AND POSITIONING METHOD OF PROCESSING TOOL

(71) Applicant: KAWASAKI JUKOGYO KABUSHIKI KAISHA, Kobe-shi, Hyogo (JP)

(72) Inventors: Tomohiro Kinoshita, Kobe (JP); Jun Fujimori, Himeji (JP); Yuhei Horiuchi, Nishinomiya (JP); Kazunori Hara, Kakogawa (JP); Junichi Tamura, Kakamigahara (JP); Satoshi Suzuki, Kakamigahara (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 277 days.

(21) Appl. No.: 15/761,138

(22) PCT Filed: Sep. 7, 2016

(86) PCT No.: PCT/JP2016/004079
§ 371 (c)(1),
(2) Date: Mar. 19, 2018

(87) PCT Pub. No.: WO2017/047048
PCT Pub. Date: Mar. 23, 2017

(65) Prior Publication Data
US 2018/0257230 A1   Sep. 13, 2018

(30) Foreign Application Priority Data

Sep. 18, 2015   (JP) ................................ 2015-185306

(51) Int. Cl.
*G01C 21/00*   (2006.01)
*B25J 9/16*   (2006.01)
(Continued)

(52) U.S. Cl.
CPC ............... *B25J 9/1664* (2013.01); *B25J 9/06* (2013.01); *B25J 9/1633* (2013.01); *B25J 9/1638* (2013.01);
(Continued)

(58) Field of Classification Search
CPC ........ B25J 9/1664; B25J 13/08; B25J 9/1633; B25J 9/1638; B25J 9/06; B25J 9/1694;
(Continued)

(56) References Cited

U.S. PATENT DOCUMENTS

2008/0297092 A1    12/2008  Nihei et al.
2016/0011176 A1*    1/2016  Yasuda .............. G01N 15/1031
                                                                506/14
(Continued)

FOREIGN PATENT DOCUMENTS

JP         S58-206394 A     12/1983
JP         H11-221707 A      8/1999
JP         2008-296310 A    12/2008

OTHER PUBLICATIONS

Dec. 6, 2016 International Search Report issued in International Patent Application No. PCT/JP2016/004079.

*Primary Examiner* — Ian Jen
(74) *Attorney, Agent, or Firm* — Oliff PLC

(57) ABSTRACT

A device for positioning a processing tool: a processing tool for processing the to-be-processed workpiece's surface while pressing the surface to be processed; a movement mechanism able to displace processing tool's distal end in a first direction orthogonal to the surface to be processed and/or a second direction parallel with the surface to be processed; a force sensor able to detect a force in the first and second direction applied to the processing tool's distal end pressed onto the surface to be processed; and a control device for executing a correction step for controlling the movement mechanism so the surface to be processed is
(Continued)

pressed while the distal end's position of the processing tool is aligned with a processing reference position on the surface to be processed, and correcting the processing tool's position so that the force in the second direction is within a specific value or less.

9 Claims, 7 Drawing Sheets

(51) Int. Cl.
*B25J 13/08* (2006.01)
*G05B 19/404* (2006.01)
*B25J 9/06* (2006.01)
*B25J 11/00* (2006.01)

(52) U.S. Cl.
CPC ......... *B25J 9/1694* (2013.01); *B25J 11/0055* (2013.01); *B25J 13/08* (2013.01); *B25J 13/085* (2013.01); *G05B 19/404* (2013.01); G05B 2219/39176 (2013.01); G05B 2219/39322 (2013.01); G05B 2219/39528 (2013.01); G05B 2219/39529 (2013.01); *Y10S 901/09* (2013.01); *Y10S 901/41* (2013.01); *Y10S 901/46* (2013.01)

(58) Field of Classification Search
CPC ... B25J 11/0055; B25J 13/085; G05B 19/404; G05B 2219/39322; G05B 2219/39176; G05B 2219/39528; G05B 2219/39529; Y10S 901/09; Y10S 901/41; Y10S 901/46
See application file for complete search history.

(56) References Cited

U.S. PATENT DOCUMENTS

| | | | |
|---|---|---|---|
| 2017/0203434 A1* | 7/2017 | Ueda | B25J 9/0081 |
| 2017/0259431 A1* | 9/2017 | Takeuchi | B25J 9/1633 |
| 2017/0325370 A1* | 11/2017 | Nozawa | H05K 13/0413 |
| 2018/0032049 A1* | 2/2018 | Inazumi | B25J 9/1633 |
| 2018/0056521 A1* | 3/2018 | Miyamoto | B25J 11/00 |
| 2018/0071911 A1* | 3/2018 | Miyamoto | B25J 9/1633 |
| 2018/0257230 A1* | 9/2018 | Kinoshita | B25J 13/08 |
| 2018/0348744 A1* | 12/2018 | Cortsen | G05B 19/4148 |

* cited by examiner

POSITIONING DEVICE AND POSITIONING METHOD OF PROCESSING TOOL

TECHNICAL FIELD

The present invention relates to a positioning device and a positioning method of a processing tool.

BACKGROUND ART

In general, in a case where positioning of a processing tool with high accuracy is required, and processing (e.g., drilling a hole) in which a processing reaction (reactive) force is generated is performed, the position of the tip end of the processing tool is deviated due to the processing reaction force, so that accuracy of a processing position is reduced and a processing target (hereinafter will be referred to as a workpiece) is damaged. To avoid this, the processing tool attached on the tip end of a positioning device is pressed against the workpiece with a force (hereinafter will also be referred to as a pressing force) that is equal to or larger than the processing reaction force, prior to the processing. At this time, flexure of the positioning device occurs due to a counteracting force of the pressing force, and thereby the position of the tip end of the processing tool is deviated. This position deviation (position gap) negatively affects accuracy of the processing position.

Conventionally, to compensate the flexure of the positioning device, there is a method in which a flexure amount of the positioning device is calculated from a force applied to a positioning controller, by use of a stiffness value of the positioning device (see, e.g., Patent Literature 1).

In an exemplary prior art, a force sensor is attached on the tip end of an arm of a robot, a force applied to a member held by the robot and a flexure of the member occurring due to the force are detected by use of the force sensor, and the position of the member held by the robot is compensated (e.g., see Patent Literature 2). Also, there is a method in which a feeding device mounted on the tip end of an arm together with a machining tool is secured to a support base on which a workpiece is placed, during processing performed by a drilling robot (e.g., see Patent Literature 3).

CITATION LIST

Patent Literature

Patent Literature 1: Japanese-Laid Open Patent Application Publication No. 2008-296310
Patent Literature 2: Japanese-Laid Open Patent Application Publication No. Sho. 58-206394
Patent Literature 3: Japanese-Laid Open Patent Application Publication No. Hei. 11-221707

SUMMARY OF INVENTION

Technical Problem

However, in the method disclosed in Patent Literature 1, the flexure amount of the positioning device cannot be accurately calculated unless an accurate stiffness value of the positioning device is obtained. In addition, since the stiffness of the positioning device is different depending on the kind of the positioning device, it is necessary to change the stiffness value used in the calculation, depending on each kind.

The present invention is directed to solving the above-described problem, and an object of the present invention is to enable positioning of a processing tool, with high accuracy, without calculating a flexure amount of a positioning device by use of a stiffness value of the positioning device.

Solution to Problem

To solve the above-described problem, according to an aspect of the present invention, there is provided a positioning device of a processing tool, the positioning device comprising: the processing tool which performs processing for a processing surface of a workpiece in a state in which the processing tool is pressed against the processing surface; a movement mechanism which enables a tip end of the processing tool to be displaced in at least a first direction perpendicular to the processing surface and a second direction parallel to the processing surface; a force sensor which detects a force generated in the first direction and a force generated in the second direction, the forces being applied to the tip end of the processing tool pressed against the processing surface; and a control unit which controls the movement mechanism to cause the tip end of the processing tool to be pressed against the processing surface in a state in which a position of the tip end of the processing tool is aligned with a processing reference position on the processing surface, and performs compensation for the position of the processing tool so that the force generated in the second direction by the time the force generated in the first direction reaches a target value becomes less than a predetermined value, the force generated in the first direction and the force generated in the second direction being detected by the force sensor.

In accordance with this configuration, the tip end of the processing tool is pressed against the processing surface of the workpiece until the force generated in the first direction, which is detected by the force sensor reaches the target value. The control unit performs compensation for the position of the tip end of the processing tool so that the force generated in the second direction while the tip end of the processing tool is pressed against the processing surface becomes less than the predetermined value. This makes it possible to reduce the position deviation of the tip end of the processing tool from the processing reference position while pressing the tip end of the processing tool against the workpiece. As a result, positioning of the processing tool with high accuracy can be realized.

Since the forces applied to the tip end of the processing tool of the positioning device (e.g., robot) can be detected, the position deviation (position gap) can be reduced, even in a case where the stiffness value (e.g., flexures of the joint axes of the robot) of the movement mechanism is not known. Further, the flexure of the workpiece is assumed, and the position deviation can be reduced, even in a case where the stiffness value of the workpiece is not known.

The control unit may control the movement mechanism so that the tip end of the processing tool is pressed against the processing surface of the workpiece in a state in which the position of the tip end of the processing tool is aligned with the processing reference position on the processing surface, and a posture of the tip end of the processing tool conforms to a processing reference posture, and perform compensation for the position and posture of the processing tool so that the force generated in the second direction by the time the force generated in the first direction reaches the target value becomes less than the predetermined value, the force generated in the second direction and the force generated in the first direction being detected by the force sensor. The predetermined value of the force generated in the second direction may be equal to or less than a maximum static frictional force between the tip end of the processing tool and the workpiece.

In accordance with this configuration, since the tip end of the processing tool is pressed against the processing surface in a state in which the force generated in the second direction (the force causing the position deviation of the tip end of the processing tool) is equal to or less than the maximum static frictional force generated between the tip end of the processing tool and the workpiece, sliding of the processing tool on the workpiece does not occur.

The control unit may perform compensation for the position of the processing tool, by use of a final value of the position of the processing tool, which has been obtained by the compensation for the position of the processing tool in the processing performed for the workpiece previously, as an initial value of the position of the processing tool in the compensation for the position of the processing tool in the processing performed for the workpiece at next time.

In accordance with this configuration, the control unit obtains the final value of the position of the processing tool, which has been obtained by the compensation in the processing performed for the workpiece previously (e.g., at first time), as the initial value of the position of the processing tool in the compensation for the position of the processing tool in the processing performed for the workpiece at next time (e.g., at second time). For example, in the processing performed at second and the following time, the compensation is initiated by use of the final value of the position in the processing performed at first time. Therefore, it becomes possible to reduce time required for the compensation in the processing performed at second and the following time.

The control unit may decide as a reference position, the position of the processing tool at a time point when the force sensor detects that the tip end of the processing tool is in contact with the workpiece, the control unit may store as a relative position a final value of the position of the processing tool which has been obtained by the compensation for the reference position in the processing performed for the workpiece previously, and the control unit may perform the compensation for the position of the processing tool, by use of as an initial position used in the compensation, the relative position with respect to the reference position in the processing performed for the workpiece at next time.

For example, in a case where the same processing is repeatedly performed for the processing surface of the workpiece with the same kind while changing the workpiece, an error of a placement position of the workpiece newly placed occurs in changing of the workpiece. In this case, even in a case where the compensated position (final value) is obtained in advance, it is necessary to compensate this position, according to the placement position error every time the workpiece is changed. In accordance with the above-described configuration, for example, the tip end of the processing tool is brought into contact with the processing surface of the workpiece in a state in which the position of the tip end of the processing tool is aligned with the processing reference position of the workpiece, the control unit decides as the reference position the position of the processing tool at a time point when the force sensor detects that the tip end of the processing tool is in contact with the workpiece, and obtains the compensated position as the relative position with respect to the reference position. Then, the control unit performs the compensation for the position of the processing tool, by use of, as the initial value used in the compensation, the relative position with respect to the reference position obtained by making the tip end of the processing tool contact the workpiece, in the processing performed for the workpiece newly placed. This makes it possible to reduce the time required for performing the compensation, in view of an error of the placement position of the workpiece newly placed, even in a case where the workpiece is changed.

In the processing performed for the processing surface of the workpiece, by use of the processing tool, the control unit may control the position of the tip end of the processing tool in the second direction, and may control the position of the tip end of the processing tool or the force applied to the tip end of the processing tool, in the first direction, to maintain the position and posture of the processing tool.

In accordance with this configuration, in the processing, the control unit controls the position of the processing tool in the second direction parallel to the processing surface, and controls the position of the processing tool or the force applied to the tip end of the processing tool, in the first direction perpendicular to the processing surface, and thus the position and posture of the processing tool are maintained. This makes it possible to perform the processing with high accuracy while preventing the position deviation during the processing.

The movement mechanism may be constituted by a joint drive mechanism of a vertical articulated robot, the control unit may be constituted by a controller of the vertical articulated robot, and the processing tool may be attached on a tip end of an arm of the vertical articulated robot.

Flexure of the arm of the vertical articulated robot in a rotational direction of a rotary shaft (axis) perpendicular to the vertical direction tends to occur. The position deviation of the processing tool attached on the tip end of the arm in the second direction (vertical direction) tends to occur. In accordance with the above-described configuration, it becomes possible to reduce the position deviation of the processing tool in the processing performed by use of the vertical articulated robot.

The workpiece may be placed in a state in which at least a portion of the processing surface of the workpiece is parallel to a vertical direction.

The position deviation of the tip end of the processing tool in the second direction (e.g., vertical direction) tends to occur, due to its weight and posture conditions. In accordance with the above-described configuration, it becomes possible to realize the positioning of the processing tool with high accuracy with respect to the workpiece placed in a state in which at least a portion of the processing surface of the workpiece is parallel to the vertical direction.

According to another aspect of the present invention, there is provided a method of positioning a processing tool of a positioning device, the positioning device comprising: the processing tool which performs processing for a processing surface of a workpiece in a state in which the processing tool is pressed against the processing surface; a movement mechanism which enables a tip end of the processing tool to be displaced in at least a first direction perpendicular to the processing surface and a second direction parallel to the processing surface; a force sensor which detects a force generated in the first direction and a force generated in the second direction, the forces being applied to the tip end of the processing tool pressed against the processing surface; and a control unit which obtains a detection value of the force generated in the first direction and a detection value of the force generated in the second direction, from the force sensor, and controls the movement mechanism, the method comprising: controlling the movement mechanism so that the tip end of the processing tool is pressed against the processing surface in a state in which a position of the tip end of the processing tool is aligned with a processing reference position on the processing surface, and performing compensation for the position of the processing tool so that the force generated in the second direction by the time the force generated in the first direction reaches a target value becomes less than a predetermined value, the force generated in the first direction and the force generated in the second direction being detected by the force sensor.

Advantageous Effects of Invention

In accordance with the present invention, it becomes possible to realize positioning of a processing tool with high accuracy, without calculating a flexure amount of a positioning device by use of a stiffness value of the positioning device.

The above and further objects, features and advantages of the present invention will more fully be apparent from the following detailed description of preferred embodiment with reference to accompanying drawings.

DESCRIPTION OF EMBODIMENTS

Hereinafter, embodiments of the present invention will be described with reference to the drawings. Throughout the drawings, the same or corresponding constituents are designated by the same reference symbols and will not be described in repetition.

Embodiment 1

[Configuration of Positioning Device]

Figure 1:
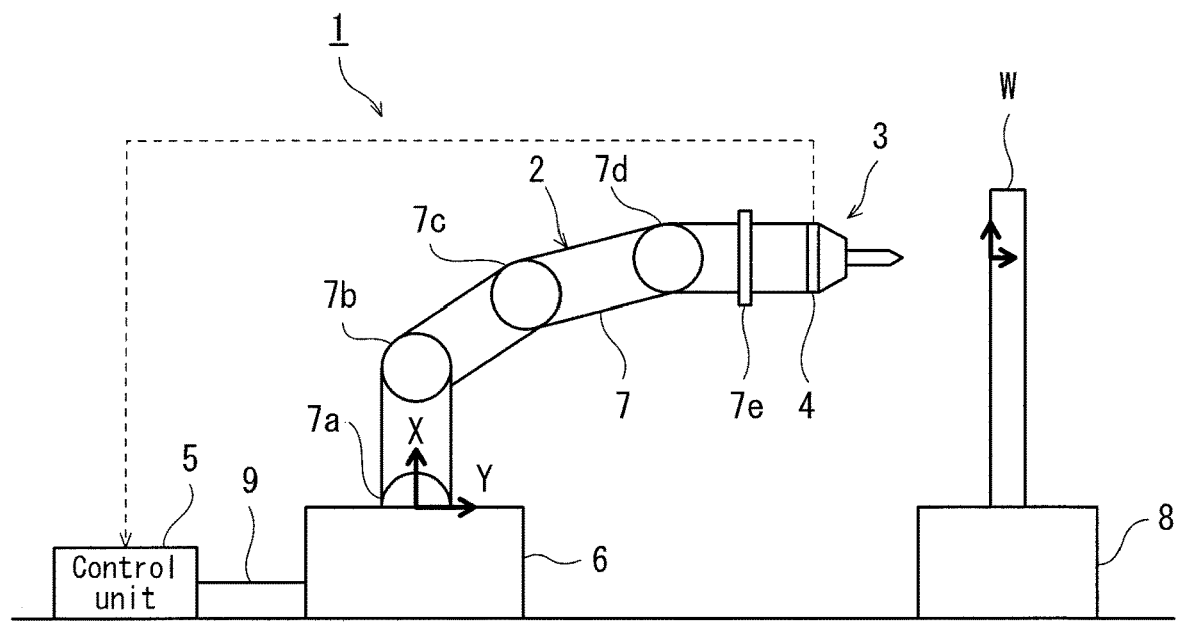
FIG. 1 is a view showing the configuration of a positioning device according to Embodiment 1 of the present invention.

FIG. 1 is a view showing the configuration of a positioning device of a processing tool (hereinafter will be simply referred to as a positioning device) 1 according to Embodiment 1 of the present invention. As shown in FIG. 1, the positioning device 1 includes a movement mechanism 2, a processing tool 3, a force sensor 4, and a control unit 5.

The movement mechanism 2 is configured to displace the tip end of the processing tool 3 in at least a first direction (hereinafter will also be referred to as a pressing direction) perpendicular to a processing surface (surface to be processed) of a workpiece W and a second direction (hereinafter will also be referred to as a workpiece surface direction) parallel to the processing surface. In the present embodiment, the movement mechanism 2 is constituted by a joint drive mechanism of a vertical articulated (multi-joint) robot (hereinafter will be simply referred to as a robot). The joint drive mechanism of the robot includes a base 6 installed on an installation surface such as a floor surface, and an arm 7 mounted on the base 6. The processing tool 3 is attached on the tip end of the arm 7 of the vertical articulated robot. A coordinate system in which the upper surface of the base 6 is a reference will be referred to as a base coordinate system. For simpler description, it is assumed that an origin of the base coordinate system is an arbitrary point on the upper surface of the base, and directions of a X-axis and a Y-axis are a horizontal direction and a vertical direction, respectively. The X-axis direction corresponds with the pressing direction. The Y-axis direction corresponds with the workpiece surface direction. The arm 7 includes a plurality of joint axes 7a to 7d which are rotational axes (rotational shafts) perpendicular to the vertical direction. Adjacent joint axes are connected to each other via a link. Each of the joint axes 7a to 7d includes a servo motor (not shown) for driving and an encoder (not shown) which is an example of a detector capable of detecting an angle of the joint. The tip end of the arm 7 is provided with a flanged tool mounting section 7e (hereinafter will also be referred to as a flange). A coordinate system in which the flange 7e is a reference will be referred to as a flange coordinate system. The processing tool 3 is attached on the flange 7e. In the present embodiment, a machining tool used as the processing tool 3 is a drill having a pointed tip end. Thus, the joint drive mechanism of the robot is configured to displace the processing tool 3 in the X-axis direction and the Y-axis direction of the base coordinate system. The movement mechanism 2 displaces the processing tool 3 attached on the tip end of the arm 7, and thus, a hole is drilled in the workpiece W.

The shape and material of the workpiece W which is a processing target (target for which processing is to be performed) of the robot are not particularly limited. For example, the shape of the workpiece W is a fuselage (body) member of an aircraft, and the material of the workpiece W is metal such as aluminum alloy. The workpiece W is secured (fixed) onto a work table 8 by a mounting member (not shown). In the present embodiment, the workpiece W is placed on the work table 8 in a state in which a processing surface (surface for which the processing is to be performed) of the workpiece W is parallel to the vertical direction.

The force sensor 4 is mounted on the processing tool 3, and is configured to detect forces applied to the processing tool 3. The force sensor 4 is configured to output detection signals to the control unit 5 by wireless or wire communication.

The control unit 5 is configured to receive the detection signals from the force sensor 4 and control the movement mechanism 2. In the present embodiment, the control unit 5 is a robot controller including a computer such as a micro controller, and is connected to the movement mechanism 2 via a cable 9. The control unit 5 is not limited to a single device and may include a plurality of devices.

Figure 2:
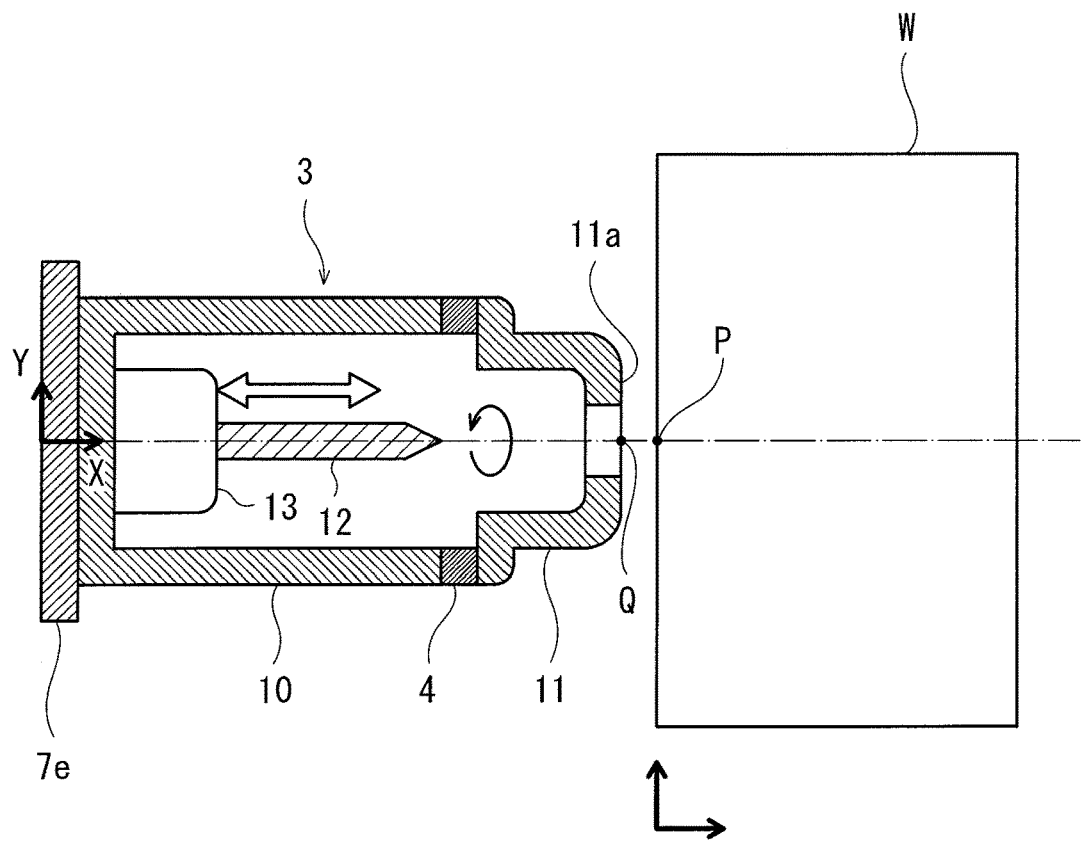
FIG. 2 is a cross-sectional view showing the configuration of a processing tool of FIG. 1.

Next, the configuration of the processing tool 3 will be described with reference to the cross-sectional view of FIG. 2. As shown in FIG. 2, the processing tool 3 includes a tool body 10, a pressing member 11, a machining tool 12, and the force sensor 4. A coordinate system in which the flange 7e is a reference will be referred to as a flange coordinate system. For simpler description, it is assumed that an origin of the base coordinate system is an arbitrary point on the flange 7e, and the X-axis direction and the Y-axis direction are the horizontal direction and the vertical direction, respectively. In the example of FIG. 2, the X-axis direction corresponds with the pressing direction perpendicular to the processing surface of the workpiece W, and the Y-axis direction corresponds with the workpiece surface direction parallel to the processing surface.

The tool body 10 has a cylindrical shape. The first end of the tool body 10 is secured (fixed) to the flange 7e, and the pressing member 11 is attached on the second end of the tool body 10 via the force sensor 4 with a ring shape. Alternatively, the first end of the tool body 10 may be attached on the flange 7e via the force sensor 4 with the ring shape, and the pressing member 11 may be attached on the second end of the tool body 10. The tool body 10 accommodates therein the machining tool 12. The tool body 10 may not have the cylindrical shape. The tip end of the pressing member 11 is formed with a pressing surface 11a which is to be pressed against the processing surface of the workpiece W. The pressing surface 11a has in a center portion thereof a circular hole through which a drill is moved. The pressing surface 11a is pressed against the processing surface of the workpiece W in the pressing direction in a state in which a center position of the hole is aligned with a processing reference position P on the processing surface of the workpiece W. In the present embodiment, the tip end of the processing tool 3 means a center position Q of the pressing surface 11a of the pressing member 11.

In the present embodiment, the machining tool 12 is the drill. The machining tool 12 is mounted on a main shaft head 13 disposed inside the tool body 10 at a location that is closer to the flange 7e. The machining tool 12 is driven by the main shaft head 13 to rotate around a center line of a main shaft. In addition, the machining tool 12 is driven by the main shaft head 13 to linearly move relatively to the pressing member 11 to drill a hole in the processing surface of the workpiece W in a state in which the pressing surface 11a of the pressing member 11 is pressed against the processing surface. Specifically, during the processing, the tip end of the machining tool 12 protrudes to an outside region through the circular hole of the pressing surface 11a and cuts the processing surface of the workpiece W (drills a hole in the processing surface). The main shaft head 13 includes a servo motor (not shown) which drives the machining tool 12 so that the machining tool 12 rotates and linearly moves, and an encoder (not shown) which is an example of a detector capable of detecting rotation or position.

The force sensor 4 has the ring shape. The force sensor 4 is mounted at a location that is between the tool body 10 and the pressing member 11, or a location that is between the flange 7e and the tool body 10. The force sensor 4 is configured to detect a force generated in the pressing direction and a force generated in the workpiece surface direction, the forces being applied to the tip end of the processing tool 3 pressed against the processing surface of the workpiece W. The force sensor 4 is, for example, a six-axis force sensor. The force sensor 4 is capable of detecting the forces in the X-axis direction, the Y-axis direction, and the Z-axis direction (the flange coordinate system of FIG. 2), and moments acting around these axes.

Figure 3:
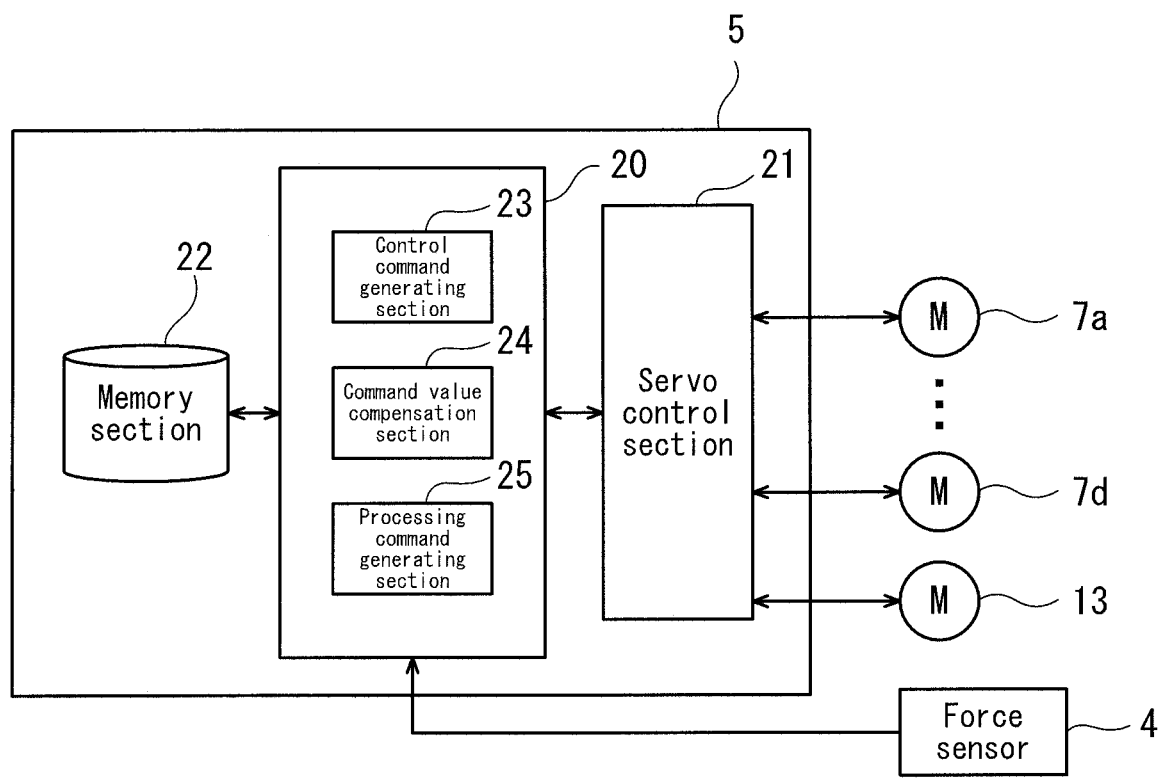
FIG. 3 is a block diagram showing the configuration of a control unit of FIG. 1.

Next, the configuration of the control unit 5 will be described with reference to a block diagram of FIG. 3. As shown in FIG. 3, the control unit 5 includes a processor section 20, a servo control section 21, a memory section 22, and an interface section (not shown). In the present embodiment, control targets (targets to be controlled) are the servo motors which drive the joint axes 7a to 7d of the arm 7, and the servo motor which drives the main shaft head 13 of the processing tool 3. The encoder which detects the position (rotational angle position of a rotor with respect to a reference rotational angle position) of the servo motor, and a current sensor which detects a value of a current flowing through the servo motor are attached on each of the servo motors. The control unit 5 is configured to obtain the positions of the servo motors which are detected by the encoders and the values of the currents flowing through the servo motors which are detected by the current sensors, via the interface section (not shown).

The memory section 22 is configured to pre-store therein base programs of the robot controller, operation programs of the robot, and position command values from a starting position to the processing reference position P of the workpiece W, and parameters such as the processing reaction force from the workpiece W during the processing, and a maximum friction force generated between the workpiece W and the tip end of the processing tool 3. In addition, the memory section 22 is configured to pre-store information required for the processing, such as processing programs.

The processor section 20 is a processor unit which executes computations (calculations). The processor section 20 is configured to execute the operation programs of the robot to generate control commands, and output the control commands to the servo control section 21. In addition, the processor section 20 is configured to execute the processing programs to generate processing commands for the processing tool, and output the processing commands to the servo control section 21.

The processor section 20 is configured to perform functional blocks (operate as the functional blocks) including a control command generating section 23, a command value compensation section 24, and a processing command generating section 25.

The control command generating section 23 is configured to decide currents required to drive the servo motors, based on position deviations of actual measurement values detected by the encoders, from predetermined position command values for the joint axes 7a to 7d, generate control commands directing the currents, and output the control commands to the servo control section 21. The predetermined position command values for the joint axes 7a to 7d are defined as the position command values for the servo motors included in the joint axes 7a to 7d, respectively, to allow the tip end of the processing tool 3 to be moved from the predetermined starting position and pressed against the processing surface in a state in which the tip end of the processing tool 3 is aligned with the processing reference position P on the processing surface of the workpiece W.

The command value compensation section 24 is configured to obtain the detection signals from the force sensor 4, compensate (perform compensation for) the predetermined position command values for the joint axes 7a to 7d, and output the compensated position command values to the control command generating section 23. The command value compensation section 24 is configured to compensate (perform compensation for) the position command value for the processing tool 3 so that the force generated in the second direction by the time the force generated in the first direction reaches a target value becomes less than a predetermined value, the force being generated in the second direction and the force generated in the first direction being detected by the force sensor 4. The position command value for the processing tool 3, which is to be compensated, refers to the position command values for the joint axes 7a to 7d, in a state in which the tip end of the processing tool 3 is aligned with the processing reference position P on the processing surface of the workpiece W.

The processing command generating section 25 is configured to decide a current required to drive the servo motor of the main shaft head 13, based on a position deviation of an actual measurement value detected by the encoder, from a predetermined position command value for the main shaft head 13, generate a processing command directing this current, and output the processing command to the servo control section 21. The predetermined position command value for the main shaft head 13 is the position command value for the servo motor included in the main shaft head 13, to allow the drill of the processing tool 3 to make a hole to a predetermined depth from the processing reference position P on the processing surface of the workpiece W.

The servo control section 21 is configured to generate currents based on the command values (the control commands or the processing command) provided to the servo control section 21, and flow the generated currents through the servo motors of the joint axes 7a to 7d and the main shaft head 13. In this way, the operations of the joint axes 7a to 7d and the operation of the main shaft head 13 are controlled.

[Positioning Operation]

Figure 4:
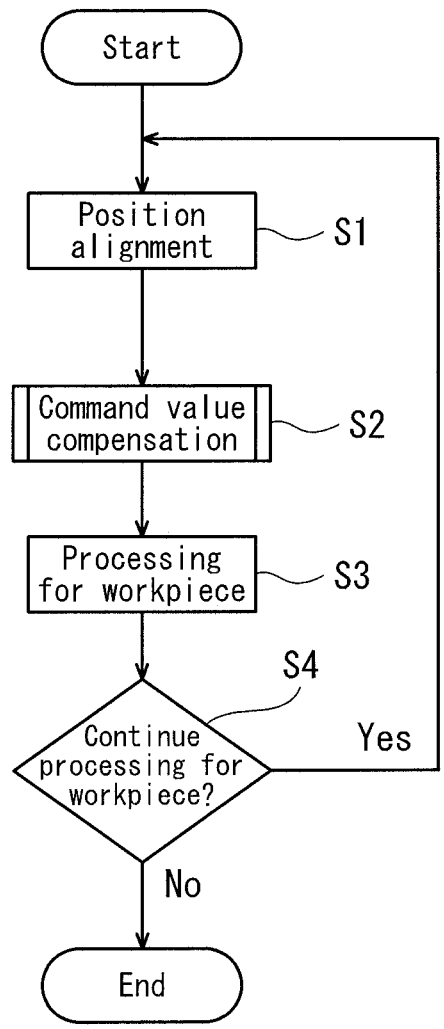
FIG. 4 is a flowchart showing an example of a positioning operation.

Next, the positioning operation performed by use of the force sensor 4 will be described. FIG. 4 is a flowchart showing an example of the positioning operation.

Figure 6:
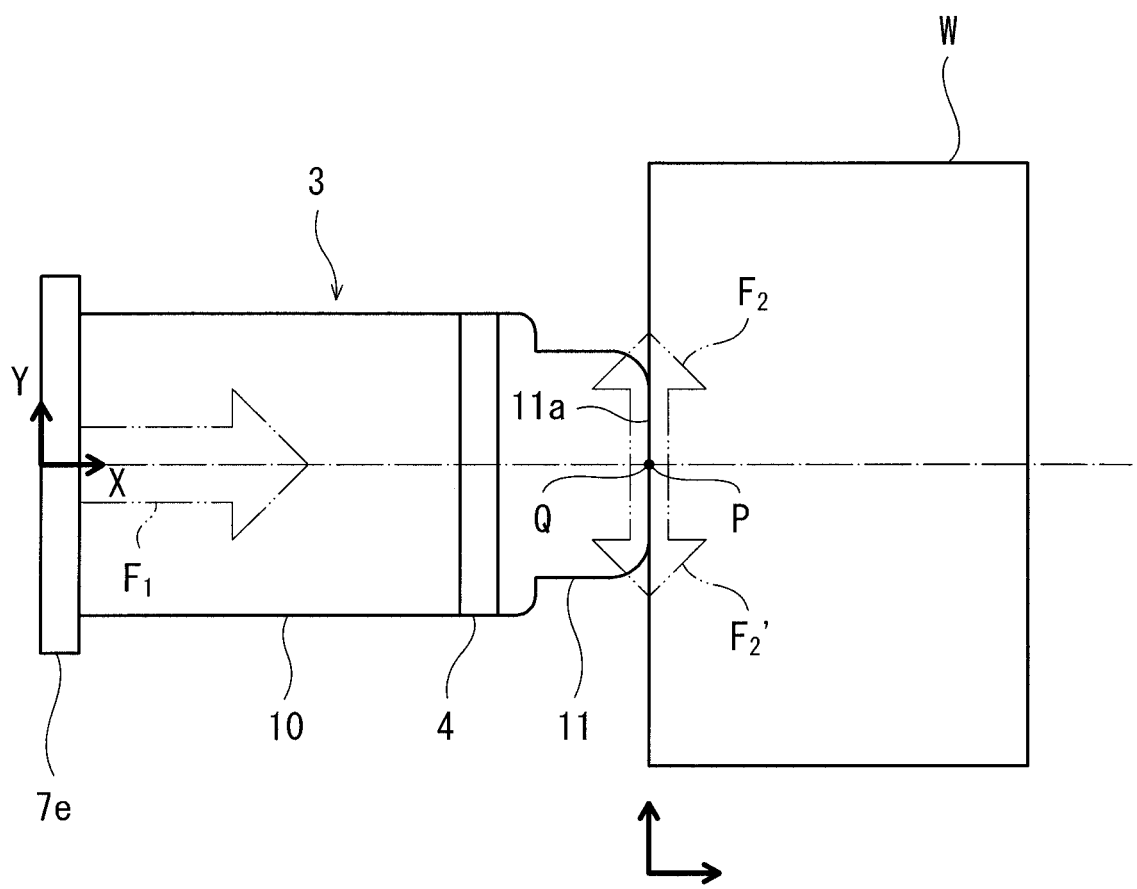
FIG. 6 is a view for explaining a pressing operation of the processing tool in a state in which the processing tool is aligned with a processing reference position.

Initially, as shown in FIG. 6, the control unit 5 controls the movement mechanism 2 so that the tip end position Q of the processing tool 3 is aligned with the processing reference position P on the processing surface of the workpiece W (step S1 of FIG. 4). The tip end position Q of the processing tool 3 is the center position of the pressing surface 11a of the tip end of the processing tool 3. The control unit 5 controls the positions of the servo motors included in the joint axes 7a to 7d so that the tip end position Q of the processing tool 3 is moved from the predetermined starting position to the processing reference position P on the processing surface of the workpiece W. Initial values of the position command values for the joint axes 7a to 7d, corresponding to tip end position Q of the processing tool 3, in this case, are expressed as $Q1=(J_{1-1}, J_{2-1}, J_{3-1}, J_{4-1})$. The position command values are expressed as coordinate values in the base coordinate system (X, Y) as the reference.

Figure 5:
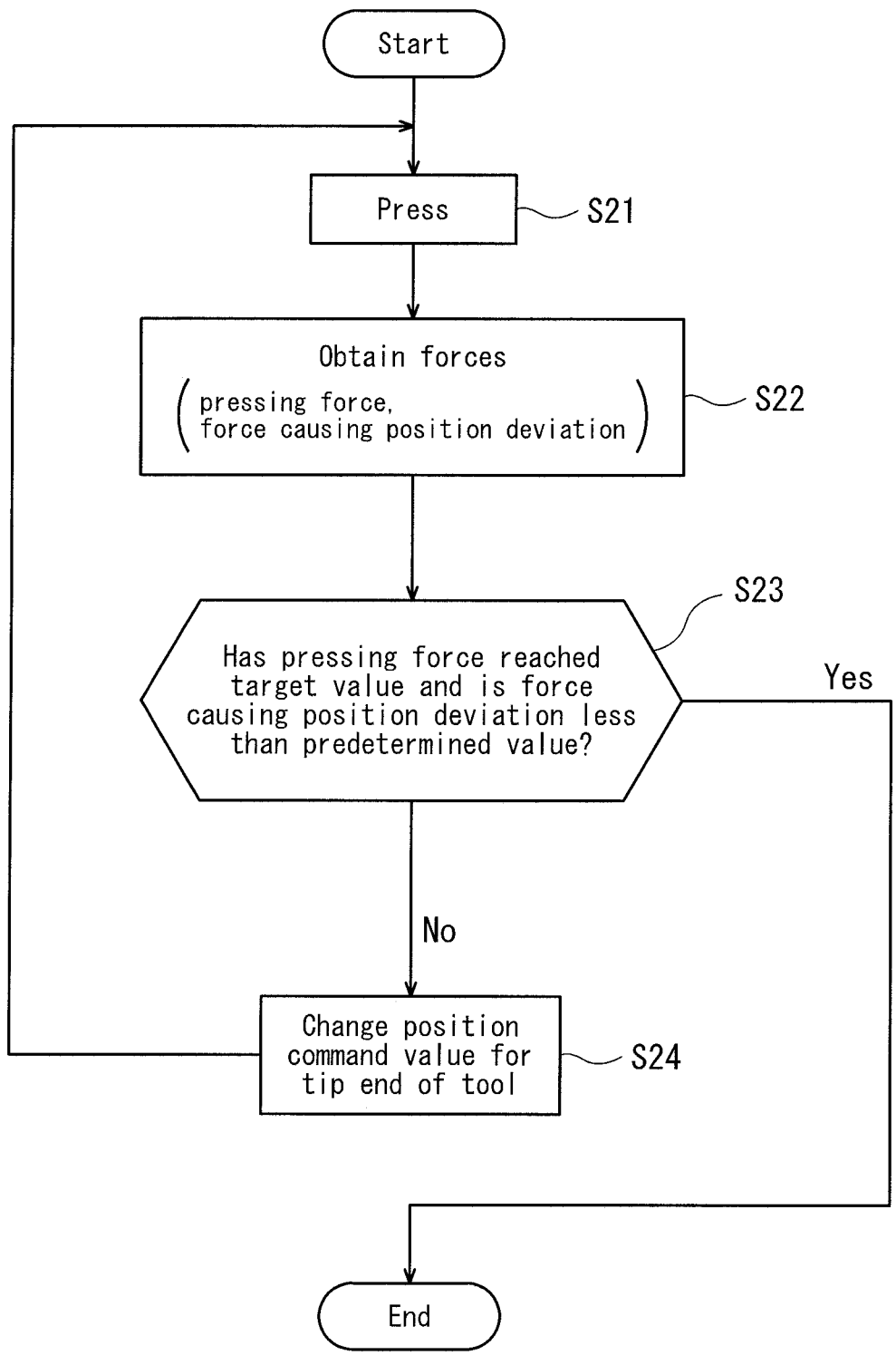
FIG. 5 is a flowchart showing the step of compensating a position command value for the processing tool of FIG. 4.

Then, the control unit 5 compensates (performs compensation for) the position command value to compensate the position deviation (position gap) (step S2 of FIG. 4). FIG. 5 is a flowchart showing the step of compensating the position command value for the processing tool. The control unit 5 causes the processing tool to be pressed against the workpiece (step S21). The control unit 5 controls the movement mechanism 2 so that the processing tool 3 is pressed against the processing surface of the workpiece W in a state in which the tip end position Q of the processing tool 3 is aligned with the processing reference position P on the processing surface (see FIG. 6). The control unit 5 controls the positions of the servo motors included in the joint axes 7a to 7d so that the tip end Q of the processing tool 3 is pressed against the processing reference position P on the processing surface of the workpiece W. At this time, the force sensor 4 detects a force F1 (hereinafter will also be referred to as the pressing force) applied in the pressing direction to the tip end Q of the processing tool 3 pressed against the processing surface of the workpiece W, and a force F2 (hereinafter will also be referred to as a force causing a position deviation (position gap) of the tip end of the processing tool 3) generated in the workpiece surface direction according to the force F1. Here, it is assumed that the force causing the position deviation works upward. F2' indicates a force working in a direction opposite to the direction of the force F2 causing the position deviation.

Then, the control unit 5 obtains the detection signals (the pressing force F1 and the force F2 causing the position deviation) from the force sensor 4 (Step S22).

Then, the control unit 5 determines whether or not the pressing force F1 has reached the target value and the force F2 causing the position deviation (position gap) of the tip end of the processing tool 3 is less than the predetermined value (step S23). In a case where the control unit 5 determines YES, the pressing operation performed by the processing tool 3 is ended.

Figure 7:
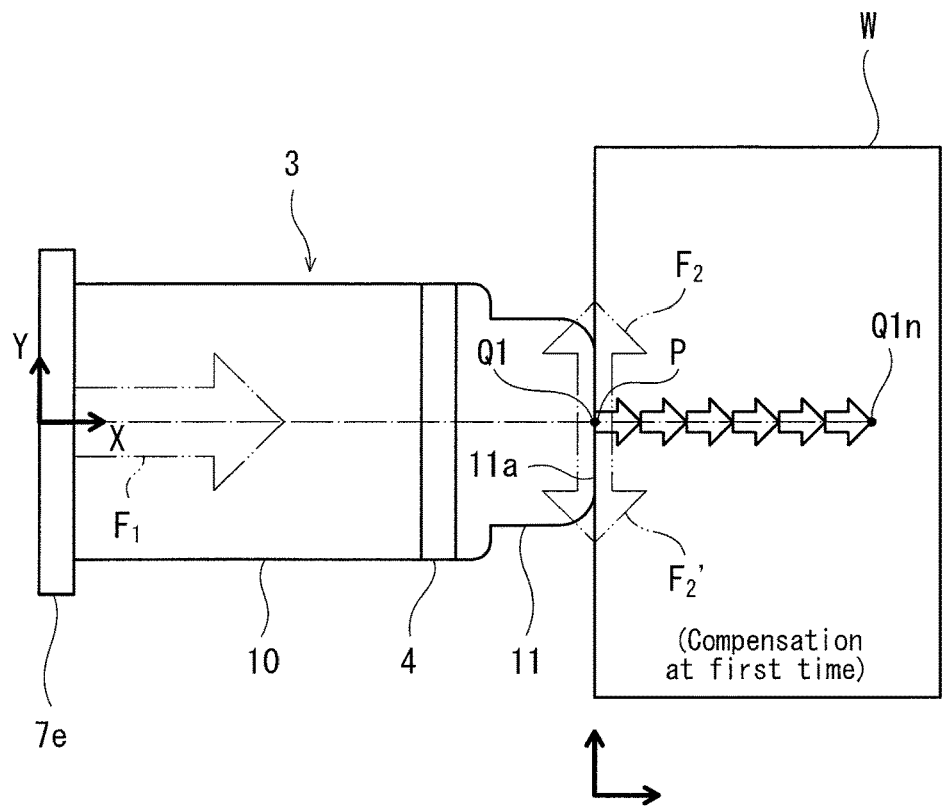
FIG. 7 is a view for explaining the step of compensating the position command value for the processing tool.

In a case where the control unit 5 determines NO, the control unit 5 performs the step of compensating the position command value for the tip end position Q of the processing tool 3 (step S24). As shown in FIG. 7, the control unit 5 causes the tip end of the processing tool 3 to be further pressed against the processing surface of the workpiece W, while changing the position command value $Q1=(J_{1-1}, J_{2-1}, J_{3-1}, J_{4-1})$ for the tip end position Q of the processing tool to cancel the force F2 causing the position deviation so that the force F2 becomes less than the predetermined value. At this time, the control unit 5 calculates a change amount of the position command value for the tip end position Q of the processing tool 3 based on the magnitude of a deviation (difference) of the pressing force F1 from the target value and the magnitude of a compensation amount of the force F2 causing the position deviation. The control unit 5 repeats the above-described steps S21~S24 until the control unit 5 determines YES. For example, a final value of the position command value for the processing tool 3 in a case where the pressing force F1 reaches the target value after the pressing operation is performed n times is expressed as the compensated position command $Q1n=(J_{1-n}, J_{2-n}, J_{3-n}, J_{4-n})$. In the present embodiment, the target value of the pressing force F1 is set to a value which is equal to or larger than a value of at least a processing reaction force. The predetermined value of the force F2 causing the position deviation is, for example, a maximum static frictional force generated between the tip end of the processing tool 3 and the workpiece W.

In the above-described manner, the control unit 5 compensates (performs compensation for) the position command value Q1 for the tip end position Q of the processing tool 3 so that the force F2 generated in the second direction by the time the force F1 generated in the first direction reaches the target value becomes less than the predetermined value, the force F1 and the force F2 being detected by the force sensor 4. Specifically, the control unit 5 controls the movement mechanism 2 so that the processing tool 3 is pressed against the processing surface of the workpiece W in a state in which the tip end position of the processing tool 3 is aligned with the processing reference position on the processing surface, and performs the step of compensating the position of the processing tool so that the force generated in the second direction by the time the force generated in the first direction reaches the target value becomes less than the predetermined value, the force generated in the second direction and the force generated in the first direction being detected by the force sensor 4. With this control, the position deviation (position gap) of the tip end of the processing tool 3 from the processing reference position P can be reduced, while pressing the tip end of the processing tool 3 against the workpiece W. In this way, the positioning of the processing tool with high accuracy can be realized. In the above-described operations, the processing tool 3 is least likely to damage the workpiece W.

Since the force sensor 4 is configured to detect the forces applied to the tip end of the processing tool 3, the position deviation (position gap) of the processing tool 3 can be reduced, even in a case where the stiffness value (e.g., flexures of the joint axes of the robot) of the movement mechanism 2 is not known. In a case where flexure of the workpiece W occurs, the position deviation of the tip end of the processing tool 3 occurs, by the force F2 causing the position deviation. In this case, the position deviation of the tip end of the processing tool 3 can be reduced.

After the compensation step, the positioning device 1 performs the step of processing the workpiece W in which the processing is performed for the processing surface of the workpiece W, by use of the processing tool 3 (step S3 of FIG. 4). In the present embodiment, the processing performed for the workpiece W is drilling a hole in the processing surface by use of the drill. In the step of processing the workpiece W, the control unit 5 controls the position of the tip end of the processing tool 3 in the pressing direction (the first direction) and the workpiece surface direction (the second direction) so that the position and posture of the processing tool 3 can be maintained. In this way, the processing with high accuracy can be performed for the workpiece W while preventing the position deviation of the processing tool 3 during the processing.

After the step of processing the workpiece W, the control unit 5 changes (replaces) the workpiece W and returns to step 1 in a case where the step of processing the workpiece W is continued (step S4 of FIG. 4).

Embodiment 2

Figure 8:
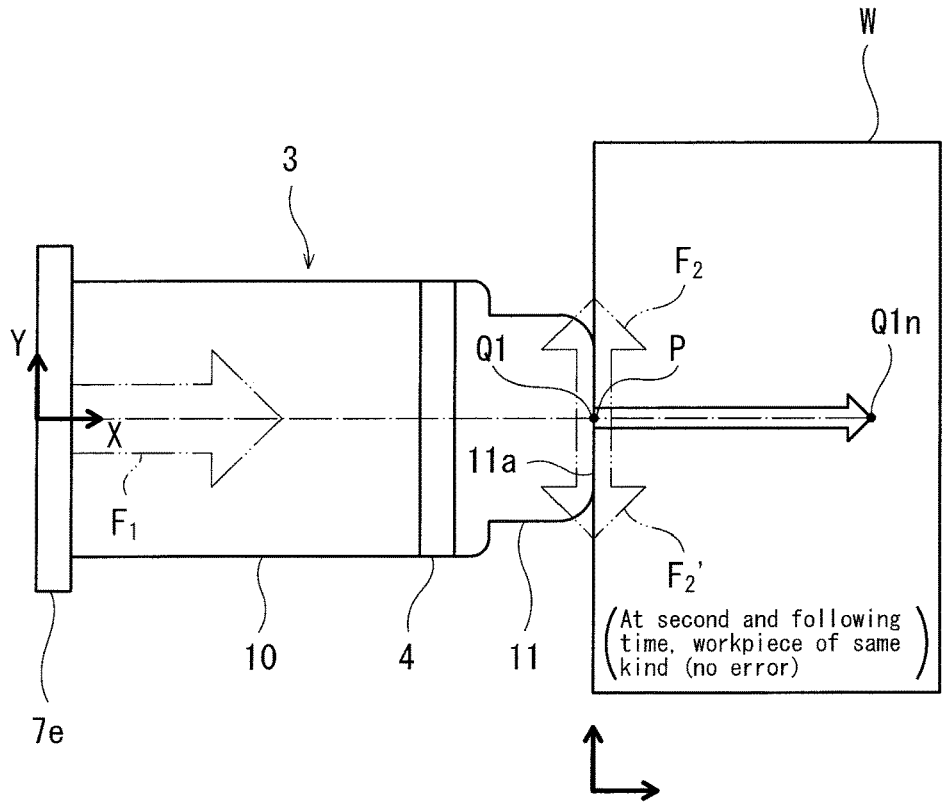
FIG. 8 is a view for explaining the step of compensating the position command value in processing performed for a workpiece (there is no placement position error) at second and the following time according to Embodiment 2.

Next, as embodiment 2, the compensation step in the processing performed for the workpiece at second and the following time will be described. FIG. 8 is a view for explaining the step of compensating the position command value in processing performed for the workpiece at second and the following time. In Embodiment 2, it is assumed that there is no error in placement position of the workpiece W. Specifically, the shape and placement position of the workpiece W are the same in the processing performed for the workpiece at first time and the processing performed for the workpiece W at second time.

The control unit 5 performs the step of compensating the position of the processing tool by use of the final value $Q1n=(J_{1-n}, J_{2-n}, J_{3-n}, J_{4-n})$ of the position command value for the processing tool which has been obtained in the compensation step (Steps S21 to S24 of FIG. 6) in previous processing (processing performed for the workpiece at first time in Embodiment 2), as an initial value $Q1n$ of the position command value for the processing tool in the compensation step in the processing performed for the workpiece at next time (processing performed for the workpiece at second time in Embodiment 2).

Specifically, prior to the processing performed for the workpiece at second time, the control unit 5 pre-stores in the memory section 22 the final value $Q1n=(J_{1-n}, J_{2-n}, J_{3-n}, J_{4-n})$ of the position command value which has been obtained in the compensation step in the processing performed for the workpiece at first time. Then, the control unit 5 obtains the final value $Q1n=(J_{1-n}, J_{2-n}, J_{3-n}, J_{4-n})$, as the initial value $Q1n$ of the position command value used in the compensation step in the processing performed for the workpiece at second time. In other words, in the processing performed for the workpiece at second time, the positioning of the processing tool is performed without performing the compensation step to obtain the value Q1 to the value Qn, or the above-described compensation step is performed while pressing the processing tool 3 against the processing surface of the workpiece W by use of the value $Q1n$ as the position command value (position). This makes it possible to reduce time required for the compensation step in the processing performed for the workpiece at second and the following time.

In summary, the control unit 5 may perform the compensation step, by use of the final value $Q1n$ of the position command value (position) for the processing tool 3, which has been obtained in the compensation step in the processing performed for the workpiece previously, as the initial value of the position command value (position) for the processing tool 3 in the compensation step in the processing performed for the workpiece at next time.

Embodiment 3

Figure 9:
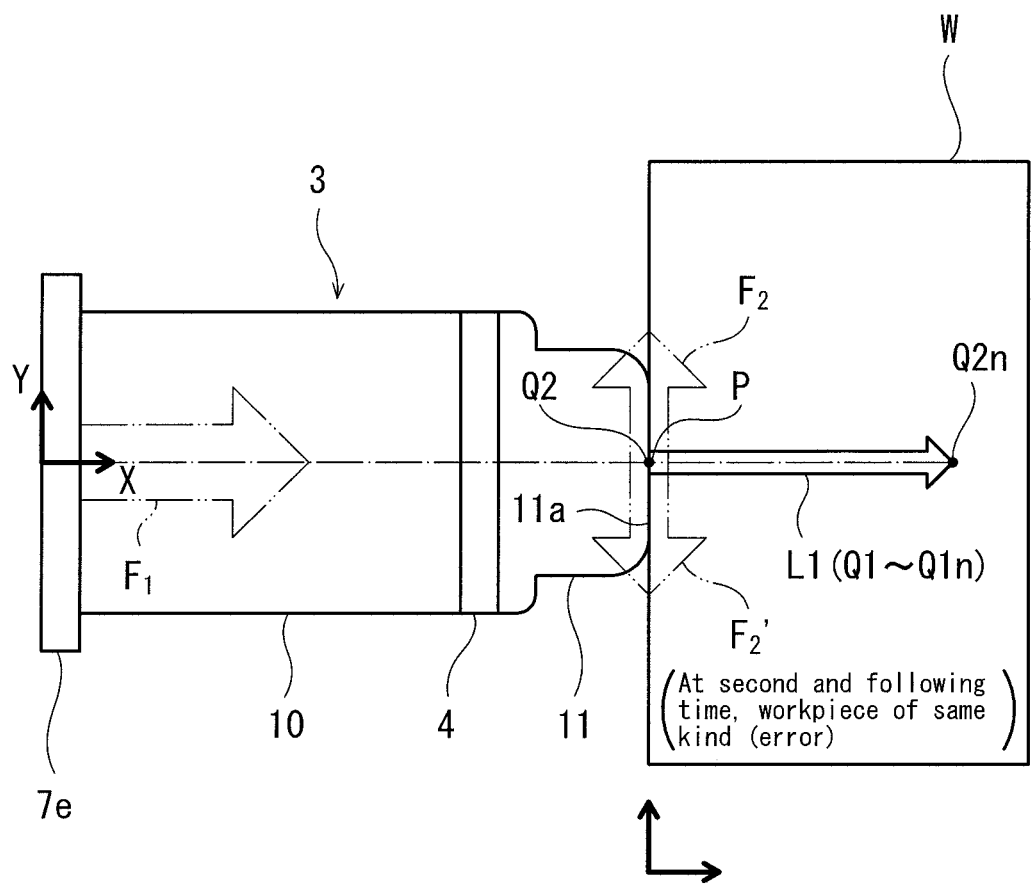
FIG. 9 is a view for explaining the step of compensating the position command value in processing performed for the workpiece (there is a placement position error) at second and the following time according to Embodiment 3.

Next, as Embodiment 3, the compensation step in the processing performed for the workpiece at second and the following time will be described. FIG. 9 is a view for explaining the step of compensating the position command value in processing performed for the workpiece at second and the following time. In Embodiment 3, it is assumed that there is an error in placement position of the workpiece W. Specifically, the shape of the workpiece W is the same but the placement position of the workpiece W is different in the processing performed at first time and the processing performed at second time. Typically, in a case where the same processing is performed in repetition for the processing surface of the workpiece W with the same kind while changing the workpiece W, a placement error of the workpiece W newly placed occurs in changing of the workpiece W. In this case, even when the compensated position command (final value) is obtained in advance, it is necessary to compensate the position command value according to the placement position error every time the processing is performed for the workpiece W.

The control unit 5 decides as a reference command value, the position command value Q1 of the processing tool 3 at a time point when the force sensor 4 detects that the tip end Q of the processing tool 3 is in contact with the workpiece W. Specifically, in the alignment step in the processing performed for the workpiece at first time (step S1 of FIG. 4), prior to the processing performed for the workpiece W at second time, the control unit 5 causes the force sensor 4 to detect that the tip end Q of the processing tool 3 is in contact with the processing reference position P on the processing surface. The control unit 5 stores in the memory section 22 the initial values $(J_{1-1}, J_{2-1}, J_{3-1}, J_{4-1})$ of the position command values for the joint axes 7a to 7d corresponding to the tip end position Q of the processing tool 3 at this time, as the reference command values. In addition, the control unit 5 stores in the memory section 22 the final command value $Q1n$ of the position command value which has been obtained in the compensation step for the reference command value Q1 in the processing performed previously (the processing performed for the workpiece at first time, in Embodiment 3), as a relative command value L1 (=Q1~Q1n).

In the processing performed for the workpiece at next time (processing performed at second time in Embodiment 3), the control unit 5 decides as a reference command value, a position command value Q2 for the processing tool 3 at a time point when the force sensor 4 detects that the tip end Q of the processing tool 3 is in contact with the processing reference position P on the processing surface, in the alignment step (Step S1 of FIG. 4) in the processing performed at second time. Then, the control unit 5 performs the compensation step by use of the relative command value L1 (=Q1~Q1n) with respect to the reference command value Q2 as an initial value Q2n used in the compensation step. This makes it possible to reduce time required for the compensation step while considering an error occurring in placement position of the workpiece newly placed in a case where the workpiece is changed.

Specifically, the control unit 5 decides as the reference position (reference command value), the position (position command value) for the processing tool 3 at a time point when the force sensor 4 detects that the tip end of the processing tool 3 is in contact with the workpiece W, stores as the relative position (relative command value L1) the final value (final value Q1n of the position command value) of the position which has been obtained in the compensation step for the reference position (reference command value Q1) in the processing performed for the workpiece W previously, and perform the compensation step by use of as the initial value used in the compensation step, the relative position (relative command value L1) with respect to the reference position (reference command value Q2) in the processing performed for the workpiece W at next time.

Other Embodiment

Although in the above-described embodiments, the position command value for the robot is compensated, a speed command value for the robot may be compensated (specifically, speed command values for the joint axes 7a to 7d corresponding to the tip end position Q of the processing tool 3). In this case, for example, the control unit 5 calculates differences between previous positions of the joint axes and present positions of the joint axes (namely, movement amounts of the joint axes), and calculates the speed command values based on the differences. Further, the control unit 5 may compensate (perform compensation for) a torque command value for the robot (specifically, torque command values for the joint axes 7a to 7d corresponding to the tip end position Q of the processing tool 3). In this case, the control unit 5 calculates movement amounts of the joint axes 7a to 7d which are required to realize a movement amount of a hand tip end of the robot which is necessary to output a force, from the movement amount of the hand tip end of the robot. Then, the control unit 5 inputs as the torque command value, joint torque required to output the movement amounts of the joint axes.

The control unit 5 may control the movement mechanism 2 so that the tip end of the processing tool 3 is pressed against the processing surface of the workpiece W in a state in which the position and posture of the tip end of the processing tool 3 conform to the processing reference position on the processing surface. The control unit 5 may perform the step of compensating the position and posture of the processing tool 3 so that the force generated in the second direction by the time the force generated in the first direction reaches the target value becomes less than the predetermined value, the force generated in the second direction and the force generated in the first direction being detected by the force sensor 4.

Although in the above-described embodiments, the predetermined value of the force F2 causing the position deviation (position gap) is the maximum static frictional force generated between the tip end of the processing tool 3 and the workpiece W, the predetermined value is not limited to this, and may be an arbitrary value smaller than the maximum static frictional force.

Although in the above-described embodiments, the control unit 5 controls the position of the tip end of the processing tool 3 in the pressing direction (the first direction) and the workpiece surface direction (the second direction) to maintain the position and posture of the processing tool 3, the control unit 5 may control the force applied to the tip end of the processing tool in the pressing direction (the first direction) and control the position of the tip end of the processing tool in the workpiece surface direction (the second direction), to maintain the position and posture of the processing tool 3. In the processing performed for the workpiece (e.g., drilling a hole), the processing reaction force applied to the machining tool such as the drill is not constant during the processing. Therefore, the force control is sometimes more effective than the position control, in the control in the pressing direction.

Although in the above-described embodiments, the control unit 5 controls the movement mechanism in accordance with the predetermined position command values for the joint axes 7a to 7d, to perform the alignment of the tip end of the processing tool 3, the position of the tip end of the processing tool 3 may be aligned with the processing reference position of the workpiece W while the processing reference position of the workpiece W is identified by use of, for example, a vision sensor attached on the tip end of the robot, or the force sensor 4 may detect that the tip end of the processing tool 3 is in contact with the workpiece W.

Although in the above-described embodiments, the processing tool 3 includes the machining tool 12 and the pressing member 11 which are separately provided (see FIG. 2), the configuration of the processing tool 3 is not limited to this, so long as the processing tool 3 processes the processing surface of the workpiece W in a state in which the tip end of the processing tool 3 is pressed against the processing surface. The processing tool 3 including the machining tool 12 and the pressing member 11 which are integrated, may be, for example, a welding (joining) tool of an auto riveting unit or a friction spot welding (FDJ).

Although in the above-described embodiments, the movement mechanism 2 is constituted by the joint drive mechanism of the articulated robot, the movement mechanism 2 is not limited to this. For example, the movement mechanism 2 may be constituted by a feeding mechanism of a machining center, a drive mechanism of a turn table, etc. In this case, the control unit 5 is constituted by a NC device, and the processing tool 3 may be attached on, for example, the main shaft head.

Although in the above-described embodiments, the workpiece W is placed on the work table 8 in a state in which the processing surface is parallel to the vertical direction, it is sufficient that at least a portion of the processing surface is parallel to the vertical direction. For example, a portion of the processing surface of the workpiece W may be curved.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention.

INDUSTRIAL APPLICABILITY

The present invention is useful in processing which requires positioning of a processing tool with high accuracy, for example, drilling a hole.

REFERENCE SIGNS LIST 1 positioning device
2 movement mechanism (joint drive mechanism of robot)
3 processing tool
4 force sensor
5 control unit (controller)
6 base
7 arm
7a to 7d joint axes
7e tool mounting section
8 work table
9 cable
10 tool body
11 pressing member
12 machining tool (drill)
13 main shaft head
20 processor section
21 servo control section
22 memory section
23 control command generating section
24 command value compensation section
25 processing section
W workpiece
P processing reference position
Q tool tip end position
Q1, Q1n, Q2, Q2n position command value

The invention claimed is:

1. A positioning device of a processing tool, the positioning device comprising:
the processing tool which performs processing for a processing surface of a workpiece in a state in which the processing tool is pressed against the processing surface;
a movement mechanism which enables a tip end of the processing tool to be displaced in at least a first direction perpendicular to the processing surface and a second direction parallel to the processing surface;
a force sensor which detects a force generated in the first direction and a force generated in the second direction, the forces being applied to the tip end of the processing tool pressed against the processing surface; and
a control unit which controls the movement mechanism to cause the tip end of the processing tool to be pressed against the processing surface in a state in which a position of the tip end of the processing tool is aligned with a processing reference position on the processing surface, and performs compensation for the position of the processing tool so that the force generated in the second direction by the time the force generated in the first direction reaches a target value becomes less than a predetermined value, the force generated in the first direction and the force generated in the second direction being detected by the force sensor.

2. The positioning device of the processing tool according to claim 1,
wherein the predetermined value of the force generated in the second direction is equal to or less than a maximum static frictional force generated between the tip end of the processing tool and the workpiece.

3. The positioning device of the processing tool according to claim 1,
wherein the control unit performs the compensation for the position of the processing tool, by use of a final value of the position of the processing tool, which has been obtained by the compensation for the position of the processing tool in the processing performed for the workpiece previously, as an initial value of the position of the processing tool in the compensation for the position of the processing tool in the processing performed for the workpiece at next time.

4. The positioning device of the processing tool according to claim 1,
wherein the control unit decides as a reference position, the position of the processing tool at a time point when the force sensor detects that the tip end of the processing tool is in contact with the workpiece,
wherein the control unit stores as a relative position a final value of the position of the processing tool which has been obtained by the compensation for the reference position in the processing performed for the workpiece previously, and
wherein the control unit performs the compensation for the position of the processing tool, by use of, as an initial value used in the compensation, the relative position with respect to the reference position in the processing performed for the workpiece at next time.

5. The positioning device of the processing tool according to claim 1,
wherein in the processing performed for the processing surface of the workpiece, by use of the processing tool, the control unit controls the position of the tip end of the processing tool in the second direction, and controls the position of the tip end of the processing tool or the force applied to the tip end of the processing tool, in the first direction, to maintain the position and posture of the processing tool.

6. The positioning device of the processing tool according to claim 1,
wherein the movement mechanism is constituted by a joint drive mechanism of a vertical articulated robot,
wherein the control unit is constituted by a controller of the vertical articulated robot, and
wherein the processing tool is attached on a tip end of an arm of the vertical articulated robot.

7. The positioning device of the processing tool according to claim 1,
wherein the workpiece is placed in a state in which at least a portion of the processing surface of the workpiece is parallel to a vertical direction.

8. The positioning device of the processing tool according to claim 1,
wherein the control unit controls the movement mechanism so that the tip end of the processing tool is pressed against the processing surface of the workpiece in a state in which the position and posture of the tip end of the processing tool conform to the processing reference position on the processing surface, and performs compensation for the position and posture of the processing tool so that the force generated in the second direction by the time the force generated in the first direction reaches the target value becomes less than the predetermined value, the force generated in the second direction and the force generated in the first direction being detected by the force sensor.

9. A method of positioning a processing tool of a positioning device, the positioning device comprising: the processing tool which performs processing for a processing surface of a workpiece in a state in which the processing tool is pressed against the processing surface; a movement mechanism which enables a tip end of the processing tool to be displaced in at least a first direction perpendicular to the processing surface and a second direction parallel to the processing surface; a force sensor which detects a force generated in the first direction and a force generated in the second direction, the forces being applied to the tip end of the processing tool pressed against the processing surface, and a control unit which obtains a detection value of the force generated in the first direction and a detection value of the force generated in the second direction, from the force sensor, and controls the movement mechanism, the method comprising:

controlling the movement mechanism so that the tip end of the processing tool is pressed against the processing surface in a state in which a position of the tip end of the processing tool is aligned with a processing reference position on the processing surface; and performing compensation for the position of the processing tool so that the force generated in the second direction by the time the force generated in the first direction reaches a target value becomes less than a predetermined value, the force generated in the first direction and the force generated in the second direction being detected by the force sensor.

\* \* \* \* \*